March 23, 1954 H. SENGEBUSCH 2,673,247

SWITCHING APPARATUS FOR TELEPHONE SYSTEMS

Original Filed Dec. 18, 1947 5 Sheets-Sheet 1

INVENTOR.
Hans Sengebusch
BY
Smith, Olsen & Baird
Attys.

March 23, 1954 H. SENGEBUSCH 2,673,247
SWITCHING APPARATUS FOR TELEPHONE SYSTEMS
Original Filed Dec. 18, 1947 5 Sheets-Sheet 2
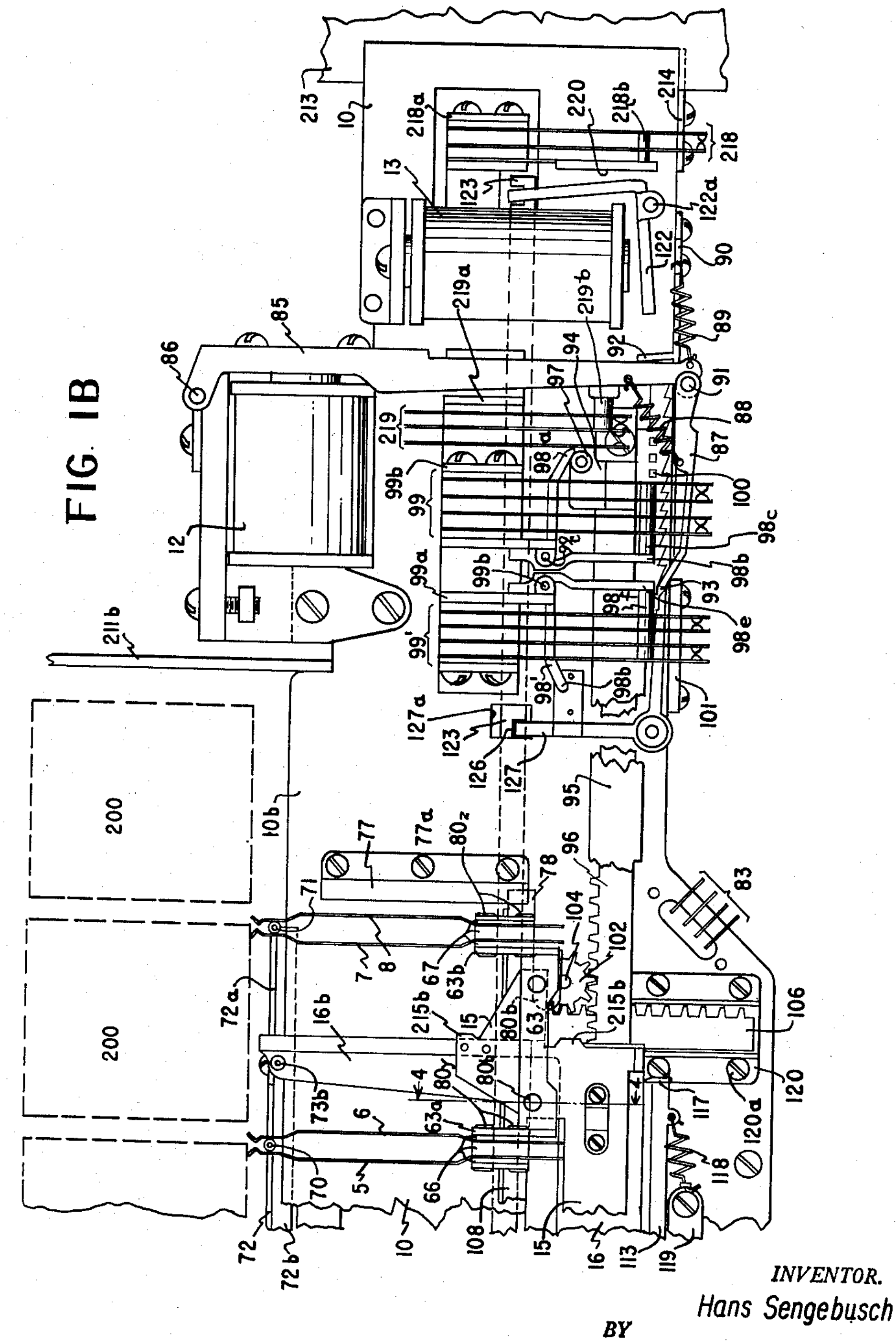
FIG. IB
INVENTOR.
Hans Sengebusch
BY
Smith, Olsen & Baird
Attys.

March 23, 1954 H. SENGEBUSCH 2,673,247

SWITCHING APPARATUS FOR TELEPHONE SYSTEMS

Original Filed Dec. 18, 1947 5 Sheets-Sheet 3

INVENTOR.
Hans Sengebusch
BY
Smith, Olsen & Baird
Attys.

March 23, 1954 H. SENGEBUSCH 2,673,247

SWITCHING APPARATUS FOR TELEPHONE SYSTEMS

Original Filed Dec. 18, 1947 5 Sheets-Sheet 4

INVENTOR.
Hans Sengebusch
BY
Smith, Olsen + Baird
Attys.

INVENTOR.
Hans Sengebusch
BY
Smith, Olsen & Baird
Attys.

Patented Mar. 23, 1954

2,673,247

UNITED STATES PATENT OFFICE 2,673,247

SWITCHING APPARATUS FOR TELEPHONE SYSTEMS

Hans Sengebusch, Chicago, Ill., assignor to Automatic Electric Laboratories, Inc., Chicago, Ill., a corporation of Delaware Original application December 18, 1947, Serial No. 792,509, now Patent No. 2,604,541, dated July 22, 1952. Divided and this application October 29, 1951, Serial No. 253,585

6 Claims. (Cl. 179—27.52)

The present invention relates to switching apparatus for telephone systems and more particularly to such apparatus of the so-called X—Y motions or flat type. This application is a division of the copending application of Hans Sengebusch, Serial No. 792,509, filed December 18, 1947, now Patent No. 2,604,541, granted on July 22, 1952.

It is an object of the present invention to provide an improved arrangement of a plurality of automatic switches, each of the X—Y motions or flat type, and a contact bank assembly commonly associated therewith.

Another object of the invention is to provide a contact bank assembly of improved and simplified construction and arrangement accommodating ready assembly and disassembly of the contact bank units incorporated therein.

A further object of the invention is to provide an improved combination contact bank unit and terminal structure therefor.

Further features of the invention pertain to the particular arrangement of the contact bank units in the assembly and the elements of each contact bank unit, whereby the above-outlined and additional operating features thereof are attained.

Figure 1A:
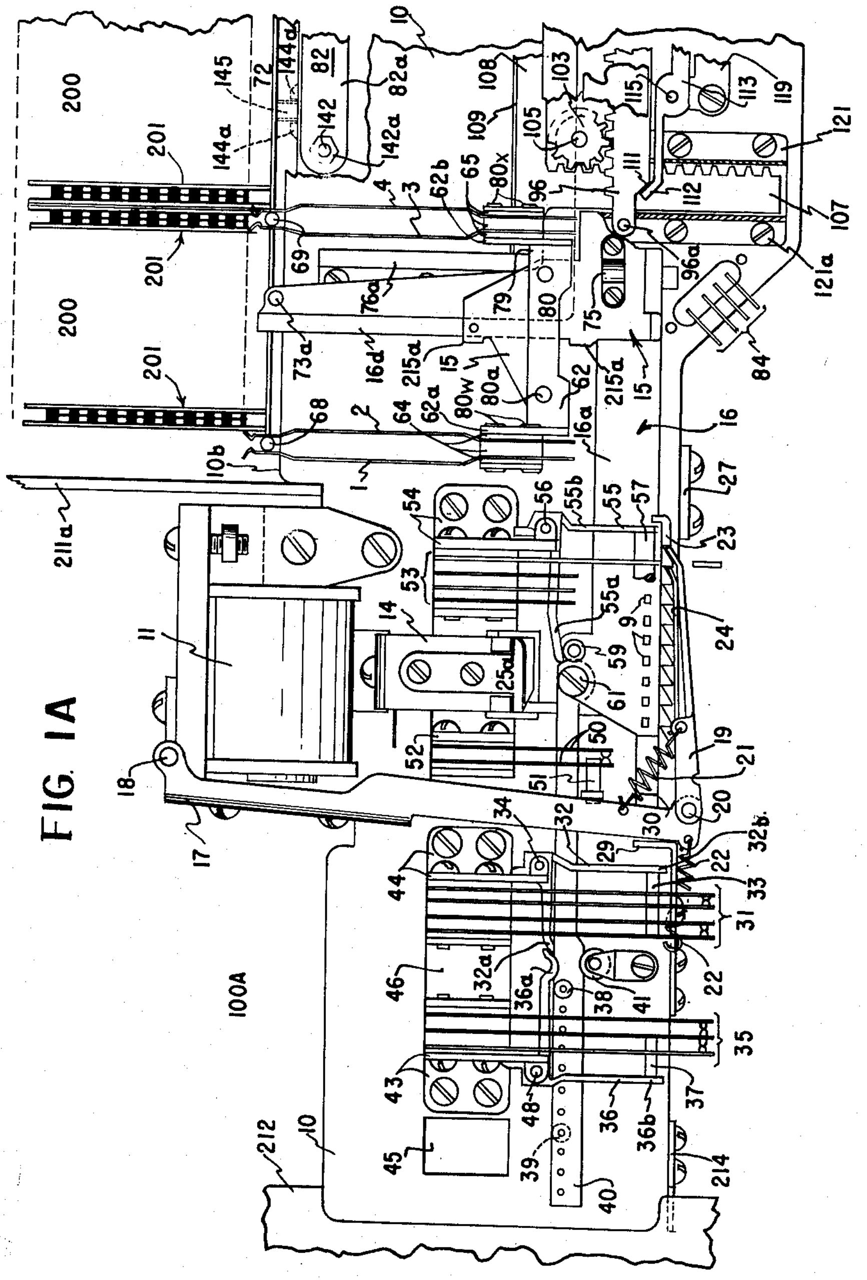
Figures 2A, 3A, 4, 6:
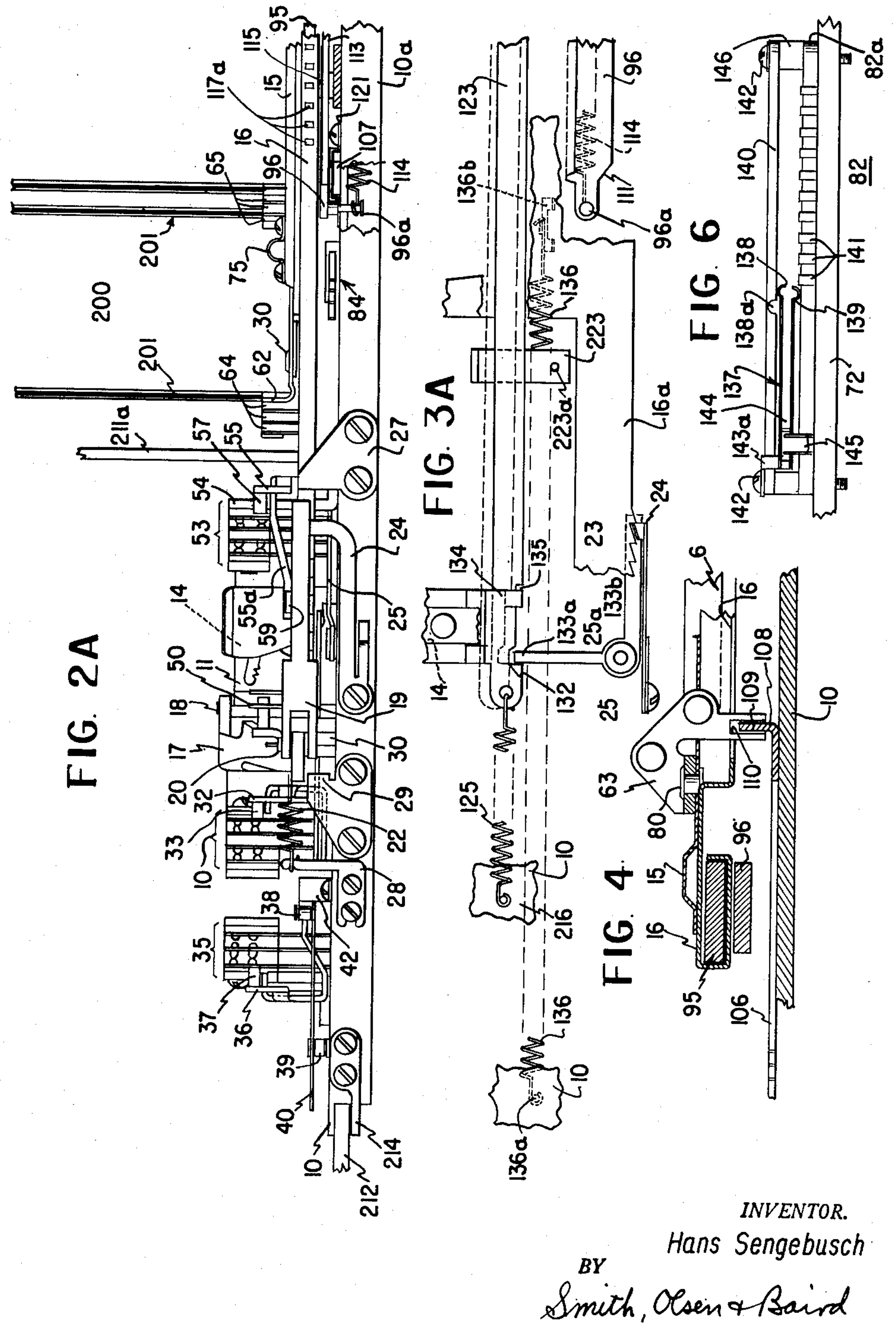
Figures 2B, 3B, 5:
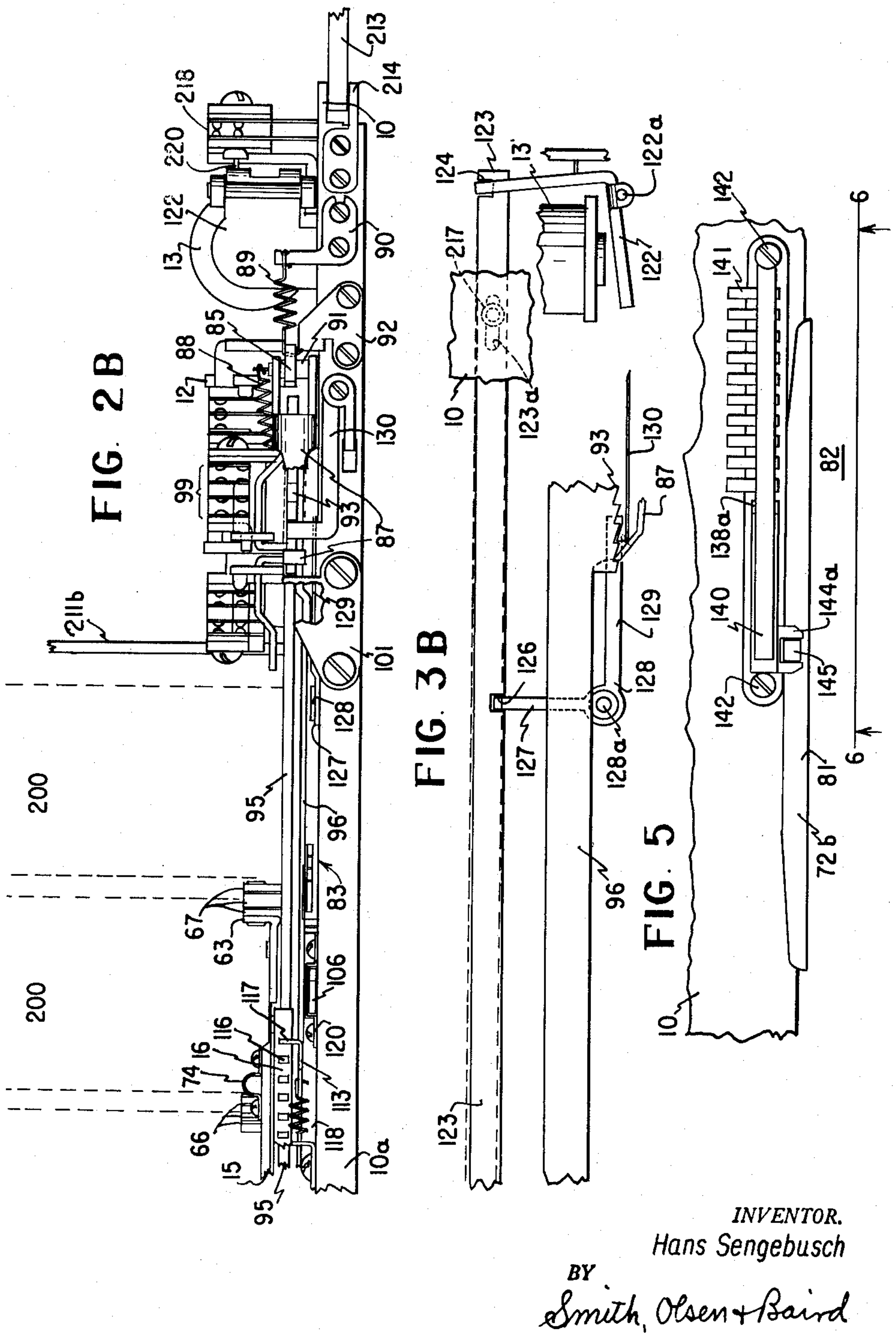
Figures 7, 8, 9:
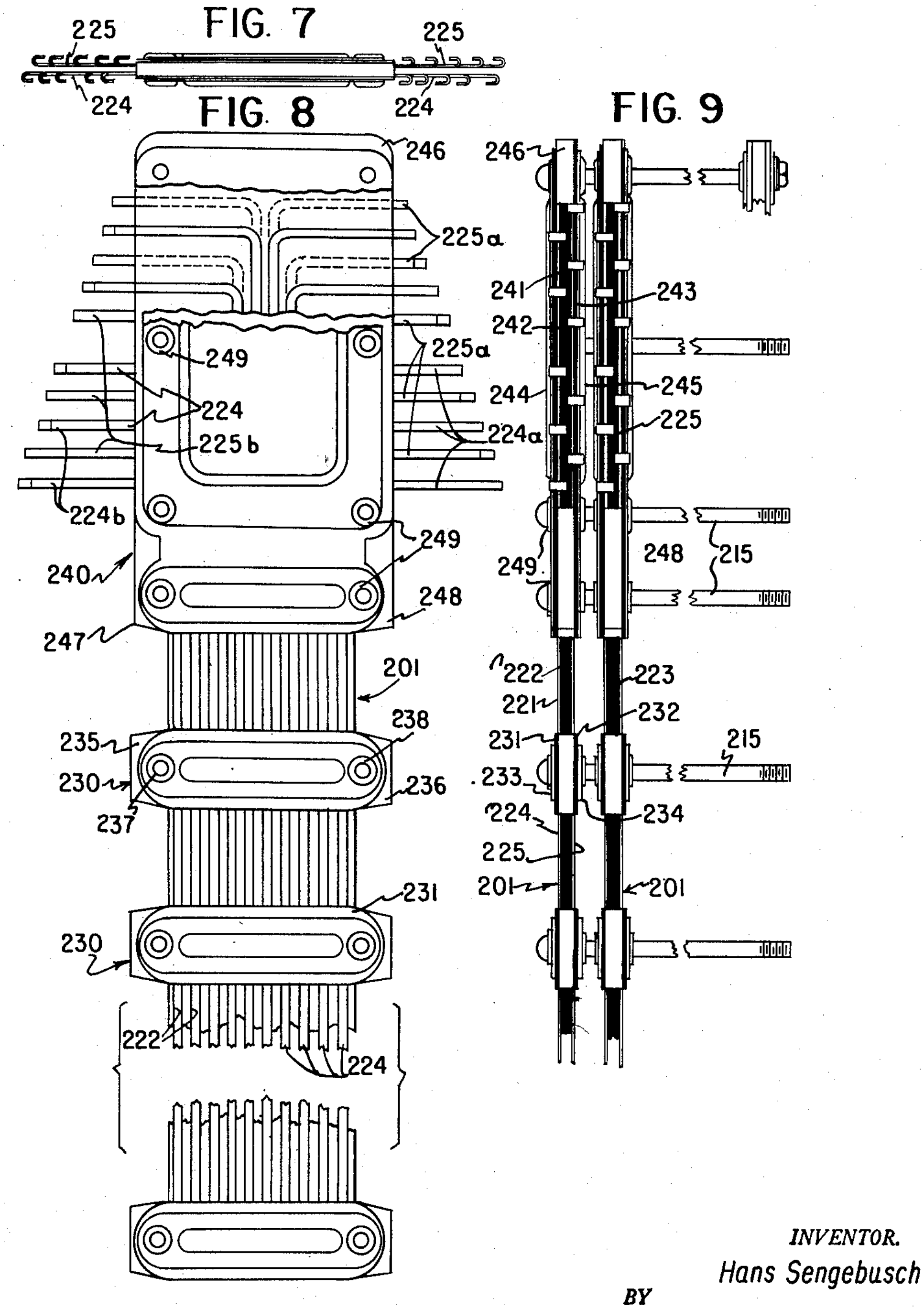

The invention, both as to its organization and method of operation, together with further objects and advantages thereof, will best be understood by reference to the following specification taken in connection with the accompanying drawings, in which Figures 1A and 1B, taken together, are a plan view, partly broken away, of switching apparatus constructed and arranged in accordance with the present invention; Figs. 2A and 2B, taken together, are a front elevational view, partly broken away, of the switching apparatus shown in Figs. 1A and 1B; Figs. 3A and 3B, taken together, are a plan view, partly broken away, of the switching apparatus shown in Figs. 1A and 1B, illustrating certain elements disposed below the base plate thereof; Fig. 4 is a fragmentary lateral sectional view, taken in the direction of the arrows along the line 4—4 in Fig. 1B, illustrating the arrangement of the primary and secondary carriages of the switching apparatus shown in Figs. 1A and 1B; Fig. 5 is a bottom view of a fragmentary central portion of the base plate of the switching apparatus shown in Figs. 1A and 1B, illustrating the cooperation between the primary carriage thereof and an associated set of control contacts; Fig. 6 is a fragmentary inverted front elevational view, taken in the direction of the arrows along the line 6—6 in Fig. 5, of the central portion of the base plate of the switching apparatus and the associated elements; Fig. 7 is a plan view of a contact bank and terminal unit associated with two of the main wipers supported by the secondary carriage of the switching apparatus shown in Figs. 1A and 1B; Fig. 8 is a fragmentary end view of the unit shown in Fig. 7; and Fig. 9 is a fragmentary front view of the unit shown in Figs. 7 and 8.

Referring now more particularly to Figs. 1A, 1B, 2A and 2B of the drawings, the switching apparatus there illustrated comprises switching mechanism 100A, contact bank structure 200 and supporting structure, including two vertically extending and longitudinally spaced apart elements 211*a* and 211*b* and two horizontally extending and longitudinally spaced apart elements 212 and 213. The switching mechanism 100A comprises a longitudinally extending base plate 10 provided with a downwardly turned front flange 10*a* and a rearwardly extending apron 10*b*. The base plate 10 is supported upon the horizontal elements 212 and 213 and the rear edge thereof abuts the front edges of the vertical elements 211*a* and 211*b*, the apron 10*b* being arranged between the longitudinally spaced apart vertical elements 211*a* and 211*b*; whereby the normal position of the base plate 10 is accurately located by the vertical elements 211*a* and 211*b* upon the horizontal elements 212 and 213 so that the switching mechanism 100*a* occupies a predetermined and exact position with respect to the associated contact bank 200. The base plate 10 is normally restrained in its normal position by two guiding devices 214 secured to the front flange 10*a* thereof respectively adjacent to the left-hand end and to the right-hand end thereof and respectively cooperating with the lower surfaces of the horizontal elements 212 and 213. Thus it will be understood that the base plate 10 may be readily removed with respect to the supporting structure, including the vertical elements 211*a* and 211*b* and the horizontal elements 212 and 213, merely by sliding it toward the front away from the contact bank 200. Accordingly, the switching mechanism 100*a* may be readily placed upon and removed from the associated supporting structure for purposes of inspection and repair.

The contact bank 200 is of the 200-point or line type, each line including a positive conductor, a negative conductor and two control conductors; whereby the contact bank 200 comprises 800 individual contact strips accessible to the switching mechanism 100A. More specifically, the contact bank 200 comprises forty individual contact units 201 arranged in four groups of ten each, each individual contact unit 201 comprising twenty individual contact strips. Each individual contact unit 201 is of the bare contact strip type extending vertically in the contact bank 200. The contact bank 200 is accessible to a number of switching apparatus, including the switching apparatus 100A, carried by the supporting structure in a vertical tier; whereby the contact bank 200 serves as a multiple between the different switching apparatus for marking purposes.

All of the elements of the switching mechanism 100A are secured to the base plate 10 so that they are properly positioned with respect to the contact bank 200 when the base plate 10 is positioned upon the supporting structure as previously explained. Specifically, the switching mechanism 100A comprises contact controlling mechanism in the form of eight main individual wipers 1, 2 and 3, 4 and 5, 6 and 7, 8; the individual wipers 1, 3, 5 and 7 constituting a first wiper set having access to 100 lines, and the individual wipers 2, 4, 6 and 8 constituting a second wiper set having access to 100 lines. Specifically, the wipers 1 and 2 may comprise positive line wipers having access to the positive line conductors of the two groups of 100 lines each; the wipers 3 and 4 may comprise negative line wipers having access to the negative line conductors of the two groups of 100 lines each; the wipers 5 and 6 may comprise first control wipers having access to the first control conductors of the two groups of 100 lines each; and the wipers 7 and 8 may comprise second control wipers having access to the second control conductors of the two groups of 100 lines each.

The two wiper sets are capable both of selective primary or longitudinal movement from the left toward the right and of selective secondary or lateral movement from the front toward the rear. Specifically, the two wiper sets are capable of ten individual steps of longitudinal movement and of ten individual steps of lateral movement. Since each of the four sections of the contact bank 200 are respectively associated with two corresponding ones of the individual wipers, each of the 200 lines is accessible to the two wiper sets. Moreover, when a given number of steps of longitudinal movement is imparted to the two wiper sets, the four corresponding contact units 201 are selected thereby; and when a given number of steps of lateral movement is imparted to the two wiper sets; eight individual contact strips comprising two lines in the four selected contact units 201 are selected. Accordingly, each combination longitudinal and lateral position of the two wiper sets corresponds to two individual lines in the contact bank 200 respectively selected by the two wiper sets. Finally, the first wiper set comprising the individual wipers 1, 3, 5 and 7 are connected by a first set of flexible conductors, not shown, to a terminal set 84 carried on the left-hand front central portion of the base plate 10; and the second wiper set comprising the individual wipers 2, 4, 6 and 8 are connected by a second set of flexible conductors, not shown, to a terminal set 83 carried on the right-hand front central portion of the base plate 10.

Considering now the construction of the switching mechanism 100A in greater detail, and referring to Figs. 1A, 1B, 2A, 2B, 3A, 3B and 4, the base plate 10 carries a longitudinally extending stationary guide bar 95 disposed adjacent to the front edge thereof and spaced thereabove. A longitudinally slidable primary carriage 16 is supported upon the guide bar 95 adjacent to the left-hand and central portions thereof; which primary carriage 16 terminates in two longitudinally spaced apart and rearwardly extending guide rails 16a and 16b. The extreme outer ends of the guide rails 16a and 16b are secured to a longitudinally extending substantially L-shaped bracket 72 by two rivets 73a and 73b; the bracket 72 comprising a vertical ledge 72a and a horizontal ledge 72b disposed adjacent to the rear edge of the base plate 10. A laterally slidable secondary carriage 15 is supported upon the guide rails 16a and 16b; the secondary carriage 15 comprising two downwardly and inwardly turned lugs 215a arranged in laterally spaced apart relation with respect to each other on the left-hand side thereof and embracing the associated flange of the guide rail 16a and two downwardly and inwardly turned lugs 215b arranged in laterally spaced apart relation with respect to each other on the right-hand side thereof and embracing the associated flange of the guide rail 16b. A substantially U-shaped bracket 62 is secured to the left-hand side of the secondary carriage 15 by two rivets 80a and terminates in two flanges 62a and 62b; the flange 62a supporting the main wipers 1 and 2 in longitudinally spaced apart relation with respect to each other by virtue of an arrangement including a plurality of intervening insulating strips 64 and a plurality of rivets 80w; and the flange 62b supporting the main wipers 3 and 4 in longitudinally spaced apart relation with respect to each other by virtue of an arrangement including a plurality of intervening insulating strips 65 and a plurality of rivets 80x. Similarly, a substantially U-shaped bracket 63 is secured to the right-hand side of the secondary carriage 15 by two rivets 80b and terminates in two flanges 63a and 63b; the flange 63a supporting the main wipers 5 and 6 in longitudinally spaced apart relation with respect to each other by virtue of an arrangement including a plurality of intervening insulating strips 66 and a plurality of rivets 80y; and the flange 63b supporting the main wipers 7 and 8 in longitudinally spaced apart relation with respect to each other by virtue of an arrangement including a plurality of intervening insulating strips 67 and a plurality of rivets 80z.

The vertical ledge 72a of the bracket 72 carries four longitudinally spaced apart pins upon which four insulating bushings 68, 69, 70 and 71 are arranged; the bushings 68, 69, 70 and 71 being disposed between the respective pairs of main wipers 1, 2 and 3, 4 and 5, 6 and 7, 8 in order to maintain the individual wipers of each pair out of contact with each other when they occupy their fully retracted positions toward the front of the base plate 10.

The primary carriage 16 comprises a normal longitudinal position and may be moved step by step therefrom in the longitudinal direction from the left toward the right as previously noted; and in order to accomplish this primary movement of the primary carriage 16, an arrangement including a primary magnet 11 is provided. The primary magnet 11 is suitably secured to the rear left-hand portion of the base plate 10 and comprises magnetic structure including an armature 17 pivotally mounted upon a pin 18 and normally biased in the clockwise direction about the pivot pin 18 by an arrangement including a coil spring 22 extending between the extreme outer end of the armature 17 and a lug 28 secured to the front flange 10*a* of the base plate 10. A pawl 19 is pivotally mounted upon a pin 20 carried on the extreme outer end of the armature 17 and cooperates with a ratchet 23 secured to a primary bar 16*a* formed integrally with the primary carriage 16 by a plurality of pins 9 adjacent to the left-hand end thereof. The pawl 19 is biased in the counterclockwise direction into engagement with the ratchet 23 by a coil spring 21 extending between the armature 17 and the pawl 19. The primary carriage 16 is normally restrained in its normal longitudinal position, the primary bar 16*a* engaging a stop 30 carried by the upper surface of the base plate 10 adjacent to the front edge thereof, by an arrangement including a coil spring 136 disposed below the base plate 10, one end of the coil spring 136 being secured to a pin 136*a* carried by the under surface of the base plate 10 and the other end of the coil spring 136 being secured to a fixture 136*b* carried by the primary carriage 16 and projecting through a slot, not shown, formed in the base plate 10 below the primary carriage 16.

When the winding of the primary magnet 11 is energized the armature 17 is attracted and rotated in the counterclockwise direction about the pivot pin 18 against the bias of the coil spring 22 causing the pawl 19 engaging the ratchet 23 to drive the primary bar 16*a* and the primary carriage 16 away from its normal longitudinal position one step toward the right away from the stop 30 and against the bias of the coil spring 136. When the ratchet 23 is thus operated by the pawl 19, a detent 24 secured to the front flange 10*a* of the base plate 10 enters the associated tooth thereby restraining the ratchet 23 in its operated position against the bias of the coil spring 136. Subsequently when the winding of the primary magnet 11 is deenergized, the armature 17 is released and rotated in the clockwise direction about the pivot pin 18 by the coil spring 22, whereby the pawl 19 engages the next tooth in the ratchet 23 thereby conditioning the pawl 19 to drive the ratchet 23, the primary bar 16*a* and the primary carriage 16 an additional step toward the right. When the primary carriage 16 is driven away from its normal longitudinal position one step toward the right, the two wiper sets are brought into longitudinal alignment with respect to the two corresponding first groups of ten lines in the two 100-line groups in the associated contact bank 200. Thus it will be understood that by energizing the winding of the primary magnet 11 a number of times the primary carriage 16 is driven a corresponding number of steps away from its normal longitudinal position toward the right in order to cause the two wiper sets to select the two corresponding groups of ten lines in the two 100-line groups in the associated contact bank 200.

The secondary carriage 15 comprises a normal lateral position and may be moved step by step therefrom in the lateral direction from the front toward the rear as previously noted; and in order to accomplish this secondary movement of the secondary carriage 15 an arrangement including a secondary magnet 12 is provided. The secondary magnet 12 is suitably secured to the rear right-hand portion of the base plate 10 and comprises magnetic structure including an armature 85 pivotally mounted upon a pin 86 and normally biased in the counterclockwise direction about the pivot pin 86 by an arrangement including a coil spring 89 extending between the extreme outer end of the armature 85 and a lug 90 secured to the front flange 10*a* of the base plate 10. A pawl 87 is pivotally mounted upon a pin 91 carried on the extreme outer end of the armature 85 and cooperates with a ratchet 93. The pawl 87 is biased in the clockwise direction into engagement with the ratchet 93 by a coil spring 88 extending between the armature 85 and the pawl 87. The ratchet 93 is secured to a fixture 94 slidably mounted upon the guide bar 95 and supporting a secondary bar or rack 96 disposed below the guide bar 95 and above the top surface of the base plate 10. The extreme left-hand end of the rack 96 carries a downwardly extending pin 96*a* disposed in a longitudinally extending guide slot, not shown, formed in the base plate 10. The rack 96 is normally restrained toward the right by a coil spring 114 disposed below the base plate 10, one end of the coil spring 114 being secured to the pin 96*a* and the other end of the coil spring 114 being secured to a pin, not shown, carried by the under surface of the base plate 10.

The rack 96 cooperates with two gears 102 and 103 respectively rotatably mounted upon two longitudinally spaced apart upstanding pins 104 and 105 carried by the base plate 10. Also the upper surface of the base plate 10 carries a longitudinally extending bracket 108 provided with an upstanding flange 109 and two longitudinally spaced apart and forwardly extending racks 106 and 107 respectively meshing with the gears 102 and 103. The bracket 108 is retained in place upon the upper surface of the base plate 10 by an arrangement comprising two substantially inverted U-shaped guide members 120 and 121 respectively receiving the racks 106 and 107, the guide members 120 and 121 being retained in place upon the upper surface of the base plate 10 by a plurality of screws 120*a* and 121*a*, respectively. Also two laterally extending guide elements 76 and 77 disposed in longitudinally spaced apart relation are secured to the upper surface of the base plate 10 by a plurality of screws 76*a* and 77*a*, respectively. The guide elements 76 and 77 respectively cooperate with two outwardly projecting lugs 79 and 78, respectively, formed on the left-hand and on the right-hand sides of the bracket 108, the lugs 79 and 78 respectively extending below overhanging flanges formed on the guide elements 76 and 77.

As previously noted the rack 96 is normally restrained in its extreme right-hand position by the coil spring 114; whereby the meshing gears 102 and 103 coact with the meshing racks 106 and 107 to restrain the bracket 108 in its retracted position toward the front of the base plate 10. The flange 62*b* formed on the right-hand side of the bracket 62 is provided with a downwardly projecting bifurcated element providing a slot, not shown, embracing the upwardly turned flange 109 formed on the bracket 108; and likewise the flange 63*a* formed on the left-hand side of the bracket 63 is provided with a downwardly projecting bifurcated element providing a slot 110, shown in Fig. 4, embracing the upwardly turned flange 109 formed on the bracket 108. Accordingly, the bracket 108 restrained in its normal lateral position as pointed out above also restrains the brackets 62 and 63 toward the front of the base plate 10; whereby the secondary carriage 15 supporting the brackets 62 and 63 is restrained in its normal lateral position toward the front of the base plate 10.

When the winding of the secondary magnet 12 is energized, the armature 85 is attracted and rotated in the clockwise direction about the pivot pin 86 against the bias of the coil spring 89 causing the pawl 87 engaging the ratchet 93 to drive the rack 96 away from its normal longitudinal position one step toward the left. The rack 96 meshing with the gears 102 and 103 rotates them one step about the pins 104 and 105 respectively; whereby the gears 102 and 103 respectively meshing with the racks 106 and 107 move the racks 106 and 107 and consequently the bracket 108 from its normal lateral position one step toward the rear of the base plate 10. Since the upwardly turned flange 109 engages the slots mentioned formed in the downwardly projecting elements carried by the flanges 62b and 63a of the brackets 62 and 63 secured to the secondary carriage 15, the secondary carriage 15 is moved away from its normal lateral position one step toward the rear of the base plate 10; whereby the two wiper sets supported by the secondary carriage 15 are driven into engagement with the first contact strips in the contact units 201 previously selected by the longitudinal movement of the primary carriage 16; whereby the two wiper sets mentioned select the first two corresponding lines in the previously selected two groups of ten lines each. When the ratchet 93 is thus operated by the pawl 87 against the bias of the coil spring 114, a detent 130 secured to the front flange 10a of the base plate 10 enters the associated tooth thereby restraining the ratchet 93 in its operated position against the bias of the coil spring 114. Subsequently, when the winding of the secondary magnet 12 is deenergized the armature 85 is released and rotated in the counterclockwise direction about the pivot pin 86 by the coil spring 89; whereby the pawl 87 engages the next tooth in the ratchet 93, thereby conditioning the pawl 87 to drive the ratchet 93 an additional step toward the left and consequently to drive the secondary carriage 15 an additional step toward the rear of the base plate 10. Thus it will be understood that by energizing the winding of the secondary magnet 12 a plurality of times, the secondary carriage 15 is driven a corresponding number of steps away from its normal lateral position toward the rear of the base plate 10 in order to cause the two wiper sets to select two corresponding lines in the two previously selected groups of ten lines each.

Also the switching mechanism 100A comprises a fixture 119 secured to the front central portion on the base plate 10; which fixture 119 is provided with an upstanding pivot pin 115 upon which an interlock lever 113 is mounted. The lever 113 is normally restrained in a clockwise direction about the pivot pin 115 by a coil spring 118 extending between the fixture 119 and the right-hand end of the lever 113. Also the left-hand end of the lever 113 is provided with a camming surface 112 that cooperates with a camming surface 111 provided on the rack 96. Finally, the extreme right-hand end of the lever 113 is provided with a latch 117 that cooperates with a series of openings 117a formed in the front edge of the primary carriage 16 embracing the guide bar 95. Accordingly, when the primary carriage 16 occupies any one of its longitudinal operated positions, a corresponding one of the openings 117a formed in the front edge thereof is brought into alignment with respect to the latch 117 carried by the lever 113. Hence, when the rack 96 is subsequently moved from its normal longitudinal position toward the left, the camming surface 111 formed thereon cooperates with the camming surface 112 formed on the lever 113; whereby the lever 113 is rotated in the counterclockwise direction about the pivot pin 115 against the bias of the coil spring 118 causing the latch 117 to enter the aligned opening 117a formed in the front edge of the primary carriage 16. Accordingly, when the secondary carriage 15 is operated one step away from its normal lateral position by the rack 96, the lever 113 is operated in order to cause the latch 117 positively to lock the primary carriage 16 in its longitudinal operated position.

Also the switching mechanism 100A comprises release mechanism including a first release magnet 13 and a second release magnet 14. The first release magnet 13 comprises magnetic structure secured to the upper right-hand portion of the base plate 10; and the second release magnet 14 comprises magnetic structure secured to the upper left-hand portion of the base plate 10 immediately forwardly of the primary magnet 11. The magnetic structure of the first release magnet 13 comprises an armature 122 pivotally mounted upon a pin 122a carried by the base plate 10; while the magnetic structure of the second release magnet 14 comprises an armature 134 pivotally mounted thereon. Also the release mechanism comprises a longitudinally extending release bar 123 disposed below the lower surface of the base plate 10 and secured in place by an arrangement comprising a screw 217 threaded into an opening formed in the base plate 10 and disposed in a longitudinally extending slot 123a formed in the release bar 123 adjacent to the right-hand end thereof. The portion of the release bar adjacent to the left-hand end thereof is supported by a substantially U-shaped bracket 223 secured to the lower surface of the base plate 10 by an arrangement including a screw 223a, the bracket 223 loosely embracing the associated portion of the release bar 123 to permit pivoting thereof about the screw 217. Also the release bar 123 is slidable longitudinally with reference to the screw 217 by virtue of the arrangement of the elongated slot 123a formed therein. The release bar 123 is normally restrained in a normal position slid toward the left and rotated in a counterclockwise direction about the screw 217 by an arrangement including a coil spring 125 extending between the extreme left-hand end of the release bar 123 and a pin 216 projecting downwardly from the base plate 10. The armature 122 of the first magnet 13 cooperates with a slot 124 formed in the release bar 123; and the armature 134 of the second magnet 14 cooperates with a slot 135 formed in the release bar 123. Also a release dog 128 is pivotally mounted on a pin 128a carried by the base plate 10 and provided with two substantially right-angularly disposed legs 127 and 129. The leg 129 of the release dog 128 projects substantially parallel to the front edge of the base plate 10 and toward the right behind the detent 130; while the leg 127 of the release dog 128 projects toward the rear of the base plate 10 and is provided with a downwardly extending portion projecting through an opening 127a formed in the base plate 10 and into a slot 126 formed in the release bar 123. Further a release dog 25 is pivotally mounted on a pin 25a carried by the base plate 10 and provided with two substantially right-angularly disposed legs 133a and 133b. The leg 133b of the release dog 25 projects substantially parallel to the front edge of the base plate 10 and toward the right behind the detent 24; while the leg 133a of the release dog 25 projects toward the rear of the base plate 10 and is provided with a downwardly extending portion projecting through an opening 25a formed in the base plate 10 and into a slot 132 formed in the release bar 123.

After the primary magnet 11 has been operated to effect longitudinal setting of the primary carriage 16 and the secondary magnet 12 has been operated to effect lateral setting of the secondary carriage 15, the switching mechanism 100A may be completely released by energizing the winding of the first release magnet 13; whereby the armature 122 is attracted and rotated in the clockwise direction about the pivot pin 122a causing the release bar 123 to be slid longitudinally toward the right against the bias of the coil spring 125 due to the cooperation between the armature 122 and the slot 124 formed in the release bar 123. When the release bar 123 is thus operated, the release dog 128 is rotated in the clockwise direction about the pivot pin 128a by virtue of the cooperation between the leg 127 thereof and the slot 126 formed in the release bar 123; and likewise, the release dog 25 is rotated in the clockwise direction about the pivot pin 25a by virtue of the cooperation between the leg 133a thereof and the slot 132 formed in the release bar 123. When the release dog 128 is thus operated the leg 129 thereof moves the detent 130, as well as the pawl 87 outwardly, whereby the corresponding teeth of the ratchet 93 are disengaged; and likewise, when the release dog 25 is thus operated, the leg 133b thereof moves the detent 24, as well as the pawl 19 outwardly, whereby the corresponding teeth of the ratchet 23 are disengaged. When the teeth of the ratchet 93 are thus disengaged, the coil spring 114 acting upon the rack 96 slides the rack 96 longitudinally toward the right back into its normal longitudinal position; whereby the rack 96 acting through the gears 102 and 103 retract the secondary carriage 15 back into its normal lateral position. Also at this time the camming surface 112 carried by the lever 113 cooperating with the camming surface 111 carried on the rack 96 releases the lever 113 permitting the coil spring 118 to rotate the lever 113 in the clockwise direction about the pivot pin 115; whereby the latch 117 disengages the corresponding opening 117a formed in the front edge of the primary carriage 16. Accordingly, at this time, the primary carriage 16 is released both by the latch 117 and by the detent 24 and the associated pawl 19. Hence the coil spring 136 acting upon the primary carriage 16 moves it toward the left back into its normal longitudinal position. When the winding of the release magnet 13 is then deenergized, the arm 122 is released and the coil spring 125 retracts the release bar 123 toward the left back into its normal longitudinal position; whereby the release dogs 128 and 25 are again rotated in the counterclockwise direction about the respective pins 128a and 25a. Thus the leg 129 of the release dog 128 disengages the detent 130 and the associated pawl 87; and likewise, the leg 133b of the release dog 25 disengages the detent 24 and associated pawl 19. At this time the switching mechanism 100A is completely released, the secondary carriage 15 occupying its normal lateral position and the primary carriage 16 occupying its normal longitudinal position.

On the other hand, after the primary magnet 11 has been operated to effect longitudinal setting of the primary carriage 16, and the secondary magnet 12 has been operated to effect lateral setting of the secondary carriage 15, the switching mechanism 100A may be partially released by energizing simultaneously the winding of the first release magnet 13 and the winding of the second release magnet 14. When the winding of the second release magnet 14 is thus energized, the armature 134 is attracted and pivoted about its pivot pin, not shown; whereby it cooperates with the slot 135 formed in the release bar 123 in the clockwise direction about the screw 217. More particularly, the release bar 123 is pivoted in the clockwise direction about the screw 217 to the dotted position shown in Figs. 3A and 3B; whereby the leg 133a of the release dog 25 rides out of the slot 132 formed in the release bar 123. Accordingly, when the winding of the first release magnet 13 is energized, the armature 122 is attracted effecting sliding of the release bar 123 toward the right away from its normal longitudinal position while it occupies its pivoted position. Thus when the release bar 123 is operated at this time, the release dog 128 is operated in the manner previously explained; however, the release dog 25 is not operated since the leg 133a thereof does not engage the slot 132 formed in the release bar 123 by virtue of the operated position of the armature 134 of the second release magnet 14. Accordingly, the operated release dog 128 effects the release of the ratchet 93 and the rack 96; however, the release dog 25 does not effect the release of the ratchet 23 and the primary carriage 16. When the rack 96 is thus released and returned toward the right into its normal longitudinal position, the secondary carriage 15 is retracted toward the front of the base plate 10 into its normal lateral position by virtue of the cooperation between the rack 96 and the gears 102 and 103 and the cooperation between the racks 106 and 107 and the gears 102 and 103. Subsequently, when the winding of the first release magnet 13 is deenergized, the armature 122 is released and the release bar 123 is returned toward the left into its normal longitudinal position by the coil spring 125. At this time when the winding of the second release magnet 14 is deenergized the armature 134 is released causing the coil spring 125 to rotate the release bar 123 in the counterclockwise direction about the screw 217; whereby the leg 133a of the release dog 25 reenters the slot 132 formed in the release bar 123.

In view of the foregoing it will be understood that after the switching mechanism 100A has been operated in the event only the winding of the release magnet 13 is energized, the secondary carriage 15 is released and returned to its normal lateral position and then the primary carriage 16 is released and returned to its normal longitudinal position. However, after the switching mechanism 100A has been operated in the event both the winding of the first release magnet 13 and the winding of the second release magnet 14 are simultaneously energized, only the secondary carriage 15 is released and returned to its normal lateral position, the primary carriage 16 being retained in its operated longitudinal position. This arrangement is very advantageous in view of the fact that either a complete release or a partial release of the switching mechanism 100A may be obtained by selective energization of the windings of the first release magnet 13 and the second release magnet 14 as explained above. The complete release of the switching apparatus 100A is effected at any time when this end is desired; whereas the partial release of the switching apparatus 100A may be effected in conjunction with a trunk-hunting operation. For example, suppose that a group of trunks extending to a P. B. X or the like is terminated in two adjacent contact sections 201 in the contact bank 200, the directory number might require operation of the primary carriage 16 three steps and operation of the secondary carriage 15 one step. At this time the automatic operation of the secondary carriage 15 is initiated; whereby it may be operated nine additional steps in the event all of the trunks in the first section of the contact bank 200 are busy. Accordingly, the secondary carriage 15 is then released and the primary carriage 16 is operated an additional step. Thereafter, the secondary carriage 15 is operated one step, whereupon automatic operation thereof is initiated to complete the trunk-hunting operation in the second section of the contact bank 200. Of course, the ultimate release of the switching apparatus 100A takes place when both the secondary carriage 15 and then the primary carriage 16 are released.

Further the switching mechanism 100A comprises primary control contact structure 82 including an insulating base plate 82a secured to the lower surface of the central portion of the apron 10b of the base plate 10 adjacent to the rear edge thereof by a pair of bolts 142 extending through openings formed in the apron 10b and carrying nuts 142a on the outer threaded shanks thereof. Also the structure 82 comprises two insulating bushings 146 surrounding the bolts 142 and a conducting guide rail 140 extending therebetween. The guide rail 140 is disposed below the insulating base plate 82a and carries longitudinally slidable wiper structure 137 including two individual wipers 138 and 139 and a connecting insulator 144. A bank 143a is secured to the insulator 144 and surrounds the guide rail 140; and the wiper 138 is provided with two downwardly extending tabs 138a embracing the sides of the guide rail 140. Further the insulating base plate 82a carries a series of ten longitudinally spaced apart contacts 141 cooperating with the wiper 139; the individual contacts 141 being spaced apart longitudinally distances corresponding to the respective steps of the primary carriage 16 in the longitudinal direction. Finally, the insulator 144 comprises two tabs 144a arranged in spaced apart relation and receiving two lugs 145 secured to the lower flange 72b of the bracket 72. The wiper structure 137 occupies a normal longitudinal position when the primary carriage 16 occupies its normal longitudinal position; and when the primary carriage 16 is moved step by step away from its normal longitudinal position toward the right, the wiper structure 137 is likewise moved away from its normal longitudinal position step by step toward the right. As noted above, the longitudinal spacings of the individual contacts 141 correspond to the steps of the primary carriage 16; whereby the wiper 139 engages a given individual contact 141 when the primary carriage 16 occupies its corresponding longitudinally stepped position. Finally, the wiper 138 engages the guide rail 140 at each step of the wiper structure 137. Thus it will be understood that the guide rail 140 may be selectively connected to the individual contacts 141 at the corresponding individual steps of the primary carriage 16; which arrangement may be employed for control and supervisory purposes in an obvious manner.

Further the switching mechanism 100A comprises two sets of control switch springs 31 and 35 that may be selectively operated in any longitudinally stepped position over the primary carriage 16 as desired. More particularly, a link 40 is secured to the primary bar 16a by a screw 61 and is mounted for longitudinal sliding movement with the primary carriage 16 by an arrangement including a guide roller 41. The set of switch springs 31 is mounted upon a bracket 44 by suitable intervening insulating strips; which bracket 44 is suitably secured to the left-hand upper surface of the base plate 10. Likewise the set of switch springs 35 is mounted upon a bracket 43 by suitable intervening insulating strips; which bracket 43 is suitably secured to the left-hand upper surface of the base plate 10. The bracket 44 carries a pivot pin 34 upon which a bell-crank 32 is mounted; the bell-crank 32 comprising an arm 32a that cooperates with a roller 39 carried by the lower side of the link 40 and an arm 32b that cooperates with an insulator 33 arranged to operate the individual switch springs 31 in the set 31. Similarly, the bracket 43 carries a pivot pin 48 upon which a bell-crank 36 is mounted; the bell-crank 36 comprising an arm 36a that cooperates with a roller 38 carried by the upper side of the link 40 and an arm 36b that cooperates with an insulator 37 arranged to operate the individual switch springs in the set 35. The rollers 39 and 38 may be secured in any one of ten holes spaced longitudinally along the link 40 in order that the sets of switch springs 31 and 35 may be operated at any desired longitudinal step of the primary carriage 16. As illustrated, the rollers 39 and 38 are respectively arranged in the seventh and first holes mentioned formed in the link 40. Accordingly, when the primary carriage 16 is stepped into its first longitudinal position, the roller 38 engages the arm 36a of the bell-crank 36 operating the set of switch springs 35. Similarly, when the primary carriage 16 is stepped into its seventh longitudinal position, the roller 39 engages the arm 32a of the bell-crank 32 operating the set of switch springs 31.

Also the switching mechanism 100A comprises a set of off-normal switch springs 53 that is operated when the primary carriage 16 is stepped away from its normal longitudinal position. Specifically, the set of switch springs 53 is mounted upon a bracket 54 by suitable intervening insulating strips; which bracket 54 is suitably secured to the left-hand upper surface of the base plate 10. The bracket 54 carries a pivot pin 56 upon which a bell-crank 55 is mounted; the bell-crank 55 comprising an arm 55a that cooperates with a roller 59 carried by the primary bar 16a and an arm 55b that cooperates with an insulator 57 arranged to operate the individual switch springs in the set 53. Accordingly, when the primary carriage 16 is stepped away from its normal longitudinal position, the roller 59 disengages the arm 55a of the bell-crank 55; whereby the arm 55b thereof operates the set of off-normal switch springs 53. Further, the switching mechanism 100A comprises a set of impulsing springs 50 mounted upon a bracket 52 by suitable intervening insulating strips; which bracket 52 is suitably secured to the left-hand upper surface of the base plate 10. Each time the primary magnet 11 effects operation of the armature 17, the armature 17 engages an insulator 51 that operates the individual switch springs of the set 50. Accordingly, as the primary magnet 11 is operated and restored, the set of impulsing springs 50 transmits a corresponding series of impulses.

Further the switching mechanism 100A comprises two sets of limit switch springs 99 and 99' respectively mounted upon two brackets 99a and 99b by suitable intervening insulating strips; the brackets 99a and 99b being suitably secured to the right-hand upper surface of the base plate 10. The bracket 99b carries a pivot pin 99c supporting a bell-crank 98; and similarly, the bracket 99a carries a pivot pin 99d supporting a bell-crank 98'. The bell-crank 98' comprises an arm 98a that cooperates with a roller 97 carried by the fixture 94 mounted on the rack 96 and an arm 98b that cooperates with an insulator 98c arranged to operate the individual switch springs in the set 99. Likewise, the bell-crank 98' comprises an arm 98d that cooperates with the roller 97 carried by the fixture 94 mounted on the rack 96 and an arm 98e that cooperates with an insulator 98f arranged to operate the individual switch springs in the set 99'. When the rack 96 is stepped away from its normal longitudinal position, the roller 97 disengages the arm 98a of the bracket 98, whereby the arm 98b thereof causes the insulator 98c to operate the set of limit switch springs 99. When the rack 96 is stepped away from its normal longitudinal position ten steps, the roller 97 engages the arm 98d of the bell-crank 98' causing the insulator 98f to operate the set of limit switch springs 99'.

Further the switching mechanism 100A comprises a set of impulsing switch springs 219 mounted upon a bracket 219a by suitable intervening insulating strips; which bracket 219a is suitably secured to the right-hand upper surface of the base plate 10. Each time the secondary magnet 12 effects operation of the armature 85, the armature 85 engages an insulator 219b that operates the individual switch springs of the set 219. Accordingly, as the secondary magnet 12 is operated and restored the set of impulsing springs 219 transmits a corresponding series of impulses. Finally, the switching mechanism 100A comprises a set of switch springs 218 mounted upon a bracket 218a by suitable intervening insulating strips; which bracket 218a is suitably secured to the right-hand upper surface of the base plate 10. Each time the first release magnet 13 effects operation of the armature 122, the armature 122 operates through a tie 220, an in-insulator 218b that operates the individual switch springs of the set 218. Accordingly, as the first release magnet 13 is operated and restored, the set of impulsing springs 218 is operated.

Reconsidering briefly the operation of the switching mechanism 100A, it will be understood that the primary magnet 11 is selectively operative to impart selective longitudinal operation to the primary carriage 16 and that the secondary magnet 12 is selectively operative to impart selective lateral operation to the secondary carriage 15. When the secondary carriage 15 is thus operated, the two wiper sets are thrust a number of steps into the contact bank, corresponding to the operation of the secondary magnet 12, in the two groups of contacts, corresponding to the operation of the primary magnet 11; whereby the two corresponding lines in the two corresponding ten line groups are selected. One of the two lines respectively selected by the two wiper sets may be selected by external relay circuits, not shown. Subsequently, the switching mechanism 100A may be completely released utilizing the first release magnet 13 or it may be only partially released utilizing both the first release magnet 13 and the second release magnet 14 as previously explained.

Considering now the construction and arrangement of the contact bank 200 in greater detail, it will be observed, as shown in Figs. 7 to 9, inclusive, that each of the four sections of the contact bank 200 comprises an assembly of ten individual contact units 201 retained in assembled relation by a plurality of bolts 215. Specifically, each contact unit 201 comprises a centrally disposed insulating body 221 in the form of a flat strip having ten laterally spaced apart grooves 222 formed in the front surface thereof and ten laterally spaced apart grooves 223 formed in the rear surface thereof, the grooves 222 and 223 being arranged in superimposed pairs. Ten individual flat strip conductors 224 are arranged in the ten grooves 222; and likewise, ten individual flat strip conductors 225 are arranged in the grooves 223. The strip conductors 224 and 225 are retained in place in the respective grooves 222 and 223 by a series of vertically spaced apart clamps 230. Each of the clamps 230 comprises front and rear insulating sheets 231 and 232 overlying the respective surfaces of the strip conductors 224 and 225, front and rear clamping plates 233 and 234, and two intervening spacing blocks 235 and 236. Finally, the elements of each clamp 230 are retained in assembled relation by two eyelets 237 and 238 respectively extending through the spacing blocks 235 and 236, as well as the adjacent ends of the clamping plates 233 and 234 and the adjacent ends of the insulating sheets 231 and 232. The eyelets 237 and 238 are of the hollow variety having an opening extending therethrough adapted to receive the clamping bolts 215 previously noted; whereby ten of the contact units 201 may be securely retained in stacked relation. The thicknesses of the insulating sheets 231 and 232 and the clamping plates 233 and 234 are such that the bodies 221 of each two adjacent contact units 201 are spaced longitudinally from each other a distance corresponding to one longitudinal step of the primary carriage 16 of the switching mechanism 100A so that when the ten assembled contact units 201 comprising a section in the contact bank 200 are supported by the associated supporting structure adjacent to the switching mechanism 100A, the contact strips 224 and 225 carried by the bodies 221 are spaced longitudinally corresponding to the various longitudinal stepped positions of the two associated main wipers carried by the secondary carriage 15. Also it is noted that the clamps 230 are spaced vertically apart in order to define a plurality of effective contact sections of each contact unit 201 therebetween that are, in turn, respectively accessible to the various wiper sets of the various switching mechanisms 100A, etc., arranged in the vertical tier in the supporting structure. Accordingly, the sections of the contact strips covered by the clamps 230 constitute connecting multiples between the effective contact sections thereof that may be employed for marking purposes between the wiper sets of the various switching mechanisms having access thereto.

Finally, each contact unit 201 comprises a terminal 240 including a central body 241, front and rear insulating sheets 242 and 243, front and rear clamping plates 244 and 245, a top spacing block 246 and left and right spacing blocks 247 and 248. Further, the elements of the terminals 240 are retained in place by means of a plurality of hollow eyelets 249 of the type previously mentioned. The individual contact strips 224 extend between the insulating body 241 and the insulating sheet 242 being disposed in suitable grooves formed in the associated surface of the insulating body 241. Likewise, the individual contact strips 225 extend between the insulating body 241 and the insulating sheet 243 being disposed in suitable grooves formed in the associated surface of the insulating body 241. As shown in Fig. 8, the first five contact strips 224 on the right-hand front side of the contact unit 201 extend upwardly and then to the right in the terminal 240 and terminate upon forwardly projecting tails 224*a*; while the second five contact strips 224 on the left-hand front side of the contact unit 201 extend upwardly and then to the left in the terminal 240 and terminate upon forwardly projecting tails 224*b*. Similarly, the first five contact strips 225 on the right-hand rear side of the contact unit 201 extend upwardly and then to the right in the terminal 240 and terminate upon rearwardly projecting tails 225*a*; while the second five contact strips 225 on the left-hand rear side of the contact unit 201 extend upwardly and to the left in the terminal 240 and terminate upon rearwardly projecting tails 225*b*. On the right-hand side of the terminal 240 the forwardly projecting tails 224*a* and the rearwardly projecting tails 225*a* are staggered upwardly toward the top spacer block 246 in order to provide additional clearance for the soldering thereto of the terminated lines; likewise on the left-hand side of the terminal 240 the forwardly projecting tails 224*b* and the rearwardly projecting tails 225*b* are staggered upwardly toward the top spacer block 246 in order to provide additional clearance for the soldering thereto of the wires of the terminates lines.

Recapitulating, it is pointed out that the switching mechanisms 100A, etc., are carried by the supporting structure, including the elements 211*a*, 211*b*, 212, 213, etc., in vertically stacked relation in what may be termed the Z direction. Likewise, the contact bank 200 extends vertically providing adjacent sections spaced apart substantially the fixed distance "Z" in the Z direction and accessible to the respective switching mechanisms. In each section of the contact bank 200, the ten individual contact units 201 are spaced longitudinally apart substantially the fixed distance "X" in the X direction and corresponding to the longitudinal steps of the primary carriages of the switching mechanisms 100A, etc. Further, the four sections of the contact bank 200 are spaced longitudinally apart corresponding to the distances between the various pairs of wipers in the two wiper sets of the switching mechanism 100A, etc. Finally, in each contact unit 201, the individual contact strips 224, as well as the individual contact strips 225, are spaced apart laterally the substantially fixed distance "Y" in the Y direction corresponding to the lateral steps of the secondary carriages of the switching mechanisms 100A, etc.

In view of the foregoing, it is apparent that there has been provided switching apparatus comprising a plurality of improved switching mechanisms and an improved contact bank assembly commonly associated therewith.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A contact bank assembly for a plurality of automatic switches stacked in the Z direction, adjacent ones of the switches being spaced-apart a substantially fixed distance "Z" in the Z direction, each of the switches being capable of coordinate step-by-step movements in the X and Y directions, in eacn of the switches each X step being a substantially fixed distance "X" and each Y step being a substantially fixed distance "Y"; said contact bank assembly comprising a plurality of contact units stacked in the X direction and extending in the Z direction; each of said contact units including a flat insulating body having a plurality of grooves formed in one surface thereof and extending in the Z direction, adjacent ones of said grooves being spaced apart shbstantially said fixed distance "Y" in the Y direction, a plurality of contact strips respectively positioned in said grooves, and a plurality of clamping elements securing said contact strips in place in said grooves, adjacent ones of said clamping elements being spaced apart substantially said fixed distance "Z" in the Z direction; and means including members extending through aligned openings provided in engaging ones of said clamping elements for clamping together engaging ones of said clamping elements carried by said contact units, engaging ones of said clamping elements carried by adjacent ones of said contact units spacing apart said adjacent contact units substantially said fixed distance "X" in the X direction.

2. A contact bank assembly for a plurality of automatic switches stacked in the Z direction, adjacent ones of the switches being spaced-apart a substantially fixed distance "Z" in the Z direction, each of the switches being capable of coordinate step-by-step movements in the X and Y directions, in each of the switches each X step being a substantially fixed distance "X" and each Y step being a substantially fixed distance "Y"; said contact bank assembly comprising a plurality of contact units stacked in the X direction and extending in the Z direction; each of said contact units including a flat insulating body having a first plurality of grooves formed in one side thereof and extending in the Z direction and a second plurality of grooves formed in the other side thereof and extending in the Z direction, adjacent ones of said first grooves and adjacent ones of said second grooves being spaced apart substantially said fixed distance "Y" in the Y direction, a first plurality of contact strips respectively positioned in said first grooves, a second plurality of contact strips respectively positioned in said second grooves, and a plurality of clamping elements securing said contact strips in place in said grooves, adjacent ones of said clamping elements being spaced apart substantially said fixed distance "Z" in the Z direction; and means including members extending through aligned openings provided in engaging ones of said clamping elements for clamping together engaging ones of said clamping elements carried by said contact units, engaging ones of said clamping elements carried by adjacent ones of said contact units spacing apart said adjacent contact units substantially said fixed distance "X" in the X direction.

3. A contact bank assembly for a plurality of automatic switches stacked in the Z direction, adjacent ones of the switches being spaced-apart a substantially fixed distance "Z" in the Z direction, each of the switches being capable of coordinate step-by-step movements in the X and Y directions, in each of the switches each X step being a substantially fixed distance "X" and each Y step being a substantially fixed distance "Y"; said contact bank assembly comprising a plurality of contact units stacked in the X direction and extending in the Z direction; each of said contact units including a flat insulating body having a plurality of grooves formed in one surface thereof and extending in the Z direction, adjacent ones of said grooves being spaced apart substantially said fixed distance "Y" in the Y direction, a plurality of contact strips respectively positioned in said grooves, and a plurality of clamping elements securing said contact strips in place in said grooves, each of said clamping elements having a pair of openings formed therein and spaced apart in the Y direction and positioned exteriorly of the edges of said flat insulating body, adjacent ones of said clamping elements being spaced apart substantially said fixed distance "Z" in the Z direction; and means including pairs of members extending through aligned pairs of said openings for clamping together engaging ones of said clamping elements carried by said contact units, engaging ones of said clamping elements carried by adjacent ones of said contact units spacing apart said adjacent contact units substantially said fixed distance "X" in the X direction.

4. A contact bank assembly for a plurality of automatic switches stacked in the Z direction, adjacent ones of the switches being spaced-apart a substantially fixed distance "Z" in the Z direction, each of the switches being capable of coordinate step-by-step movements in the X and Y directions, in each of the switches each X step being a substantially fixed distance "X" and each Y step being a substantially fixed distance "Y"; said contact bank assembly comprising a plurality of contact units stacked in the X direction and extending in the Z direction; each of said contact units including a flat insulating body having a plurality of grooves formed in one surface thereof and extending in the Z direction, adjacent ones of said grooves being spaced apart substantially said fixed distance "Y" in the Y direction, a plurality of contact strips respectively positioned in said grooves, means including a plurality of pairs of clamping plates for securing said contact strips in place in said grooves, the individual clamping plates of each of said pairs being positioned on opposite sides of said flat insulating body and having pairs of aligned openings formed therein and positioned exteriorly of the edges of said flat insulating body, and means including a pair of hollow rivets extending between pairs of the aligned openings in said pair of clamping plates for clamping in place said pair of clamping plates, adjacent ones of said clamping elements being spaced apart substantially said fixed distance "Z" in the Z direction; and means including pairs of members extending through aligned pairs of said hollow rivets for clamping together engaging ones of said clamping plates carried by said contact units, engaging ones of said clamping elements carried by adjacent ones of said contact units spacing apart said adjacent contact units substantially said fixed distance "X" in the X direction.

5. A contact unit comprising a longitudinally extending flat insulating body, a first group of L-shaped grooves formed in the right-hand front surface of said body, a second group of L-shaped grooves formed in the left-hand front surface of said body, a third group of L-shaped grooves formed in the right-hand rear surface of said body, a fourth group of L-shaped grooves formed in the left-hand rear surface of said body, the stems of said first and second grooves extending longitudinally and being arranged in laterally spaced-apart relation and the stems of said third and fourth grooves extending longitudinally and being arranged in laterally spaced-apart relation, corresponding ones of the stems of said first and third grooves being arranged in alignment through said body and corresponding ones of the stems of said second and fourth grooves being arranged in alignment through said body, the arms of said first and second grooves extending laterally and being arranged in longitudinally spaced-apart relation and the arms of said third and fourth grooves extending laterally and being arranged in longitudinally spaced-apart relation, corresponding ones of the arms of said first and second grooves being arranged in transverse alignment and corresponding ones of the arms of said third and fourth grooves being arranged in transverse alignment, the arms of said first and third grooves being staggered with respect to each other in the longitudinal direction through said body and the arms of said second and fourth grooves being staggered with respect to each other in the longitudinal direction through said body, first and second and third and fourth groups of L-shaped contact strips respectively positioned in said first and second and third and fourth groups of grooves, the arms of said first and third contact strips extending laterally toward the right and the arms of said second and fourth contact strips extending laterally toward the left, the outer ends of the arms of said contact strips projecting beyond the edges of said body and constituting terminals, front and rear insulating sheets respectively positioned on said front and rear surfaces of said body and respectively covering the bends in said first and second grooves and the bends in said third and fourth grooves, front and rear clamping plates respectively positioned on said front and rear sheets, a plurality of sets of aligned openings being formed in said front and rear sheets and in said front and rear plates exteriorly of said body, and means including a plurality of members respectively extending through said sets of openings for clamping said plates together.

6. The contact bank assembly set forth in claim 1, wherein said contact strips incorporated in each of said contact units are fanned-out adjacent to one end of each of said contact units to provide spaced-apart terminals accommodating soldered connections to external conductors.

HANS SENGEBUSCH.

References Cited in the file of this patent

UNITED STATES PATENTS

| Number | Name | Date |
|---|---|---|
| 1,103,623 | Reynolds | July 14, 1914 |
| 1,283,563 | Roberts | Nov. 5, 1918 |
| 2,071,713 | Terrill | Feb. 23, 1937 |
| 2,239,329 | Lindstrom | Apr. 22, 1941 |